United States Patent
Ziskind et al.

(10) Patent No.: US 11,032,613 B2
(45) Date of Patent: ***Jun. 8, 2021

(54) DYNAMIC SLATES FOR LIVE STREAMING BLACKOUTS

(71) Applicant: Fox Broadcasting Company LLC, Los Angeles, CA (US)

(72) Inventors: Benjamin Harry Ziskind, Santa Monica, CA (US); Steven Arthur Thorpe, Los Angeles, CA (US)

(73) Assignee: FOX BROADCASTING COMPANY, LLC, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/883,813

(22) Filed: May 26, 2020

(65) Prior Publication Data

US 2020/0359095 A1 Nov. 12, 2020

Related U.S. Application Data

(63) Continuation-in-part of application No. 16/118,291, filed on Aug. 30, 2018, now Pat. No. 10,666,991.

(51) Int. Cl.
*H04N 21/2187* (2011.01)
*H04N 21/462* (2011.01)
*H04L 29/06* (2006.01)
*H04N 21/45* (2011.01)
*H04N 21/4363* (2011.01)

(52) U.S. Cl.
CPC ....... *H04N 21/4622* (2013.01); *H04L 65/607* (2013.01); *H04L 65/608* (2013.01); *H04N 21/43637* (2013.01); *H04N 21/4524* (2013.01); *H04N 21/4621* (2013.01)

(58) Field of Classification Search
CPC .......... H04N 21/2187; H04N 21/2393; H04N 21/262; H04N 21/84; H04N 21/4821
See application file for complete search history.

(56) References Cited

U.S. PATENT DOCUMENTS

| | | | |
|---|---|---|---|
| 5,036,537 | A | 7/1991 | Jeffers et al. |
| 7,613,768 | B2 | 11/2009 | Harville et al. |
| 8,104,056 | B2 | 1/2012 | Sofos et al. |
| 8,352,997 | B2 | 1/2013 | Ospalik et al. |
| 8,578,416 | B1 | 11/2013 | Radloff et al. |
| 8,762,564 | B1 | 6/2014 | Philpott et al. |

(Continued)

FOREIGN PATENT DOCUMENTS

| | | |
|---|---|---|
| CA | 2553922 | 8/2005 |
| WO | 2007119125 | 10/2007 |
| WO | 2012087825 | 6/2012 |

OTHER PUBLICATIONS

"Blackout and Program Substitution," TelVue®, telvue.com, 2014, https://www.telvue.com/wpcontent/uploads/BlackoutProgramSubstitution.pdf.

(Continued)

*Primary Examiner* — Yassin Alata
(74) *Attorney, Agent, or Firm* — Gates & Cooper LLP

(57) ABSTRACT

A method, apparatus, and system for presenting a program guide in response to a user request to stream a broadcast subject to a blackout is disclosed. In one embodiment, the system receives a media program request, and if the requested media program is blacked out, provides information from the requesting to device to present a program guide or other information available to the user in lieu of the unavailable streamed media program.

20 Claims, 8 Drawing Sheets

(56) References Cited

U.S. PATENT DOCUMENTS

| | | |
|---|---|---|
| 8,762,850 B2 | 6/2014 | Matz |
| 8,813,114 B2 | 8/2014 | Sofos et al. |
| 8,935,722 B2 | 1/2015 | Matz |
| 9,258,587 B2 | 2/2016 | Reddy et al. |
| 9,386,327 B2 | 7/2016 | La Joie et al. |
| 9,467,750 B2 | 10/2016 | Banica et al. |
| 2003/0126600 A1 | 7/2003 | Heuvelman |
| 2005/0060648 A1 | 3/2005 | Fennelly et al. |
| 2007/0039018 A1 | 2/2007 | Saslow et al. |
| 2007/0199015 A1 | 8/2007 | Lopez et al. |
| 2007/0226765 A1 | 9/2007 | Bahnck et al. |
| 2008/0168487 A1 | 7/2008 | Chow et al. |
| 2008/0320545 A1 | 12/2008 | Schwartz |
| 2010/0125867 A1 | 5/2010 | Softs et al. |
| 2011/0041149 A1 | 2/2011 | Piepenbrink et al. |
| 2014/0195675 A1 | 7/2014 | Silva |
| 2014/0351851 A1 | 11/2014 | Stern et al. |
| 2015/0121429 A1 | 4/2015 | Ellis |
| 2015/0172731 A1 | 6/2015 | Hasek et al. |
| 2015/0271546 A1 | 9/2015 | Kim |
| 2016/0295261 A1 | 10/2016 | Ellis et al. |

OTHER PUBLICATIONS

"Program Blackout Block any content from your internet broadcast," StreamAudio, firststreaming.com, May 9, 2012. http://web.archive.org/web/20120509082631/http://firststreaming.com/blackout.php.

PCT International Search Report & Written Opinion dated Nov. 1, 2019 for PCT Application No. PCT/US2019/047081.

| MPID | Region ID | Entitle | Rules | User ID | Tmplte(s) | Alt 1 | ... | Alt N |
|------|-----------|---------|-------|---------|-----------|-------|-----|-------|
| AF2D9 | ETZ | All | R3AE | ARGRT | U21 | MP17A | ... | GM 18F |
| AF2D9 | MTZ | All | RUD3 | GETCES | S6 | MP17A | ... | GM 34T |
| AF2D9 | CTS | All | R93A | DETC | S6 | MP17A | ... | - |
| AF2D9 | LA | All | R4E2W | CFETC | U29 | MP17A | ... | GM 98Z |
| ... | ... | ... | ... | ... | ... | ... | ... | ... |
| AF2D9 | SLC | L6 | R174 | 37C | U32 | MP196X | | X |

DYNAMIC SLATES FOR LIVE STREAMING BLACKOUTS

CROSS REFERENCE TO RELATED APPLICATIONS

This application is a continuation-in-part of U.S. patent application Ser. No. 16/118,291, entitled "DYNAMIC SLATES FOR LIVE STREAMING BLACKOUTS," by Ben Ziskind et al., filed Aug. 30, 2018, issued May 26, 2020 as U.S. Pat. No. 10,666,991, which application is hereby incorporated by reference herein.

BACKGROUND

1. Field

The present disclosure relates to systems and methods for providing media programs to consumers, and in particular to a system and method for providing secondary information when streamed media is requested and unavailable.

2. Description of the Related Art

The provision of media programs to consuming users has been the subject of continuing improvement and change. Initially, media programs were provided by local broadcast television services from a limited number of sources to televisions in consumer households. These media programs were few in number (as the radio frequency bandwidth allocated for this purpose was limited), and media programs were only available from local transmitters, which may be operated by network affiliates of national television services or local television providers.

Later, media programs became available from service providers using devices known as set-top-boxes (STBs) in customer's homes. Such service providers include, for example, DIRECTV, DISH, and TIME WARNER CABLE. These service providers provide media programs ultimately obtained from content providers (such as SHOWTIME, HBO, DISCOVERY, and FX). Typically, the service provider charges its subscribers a fee, and uses these fees to pay the content providers providing the underlying media programs.

Largely due to improved signal processing and more and widespread high-speed Internet access availability (e.g. DSL, fiber, and/or satellite), digital technology permits the dissemination and playback of media programs via the Internet via the use of content delivery networks having web servers and streaming media servers.

Web servers typically use HTTP (hypertext transport protocol) on top of TCP (transfer control protocol) to transfer files over the network. Streaming media servers deliver media content continuously to a media player and media playback occurs while further portions of the media program are received. The end-user is capable of playing the media immediately upon delivery by the content provider.

Traditional streaming techniques originate from a single provider delivering a stream of data to a set of end-users. High bandwidth and central processing unit (CPU) throughput are required to deliver a single stream to a large audience, and the required bandwidth of the provider increases as the number of end-users increases. Typically, streamed media is delivered via a content delivery network (CDN) having a plurality of dedicated streaming media servers having high bandwidth capabilities. These streaming media servers are specialized devices that accept requests for video files, and with information about the format, bandwidth and structure of those files, delivers just the amount of data necessary to play the video, at the rate needed to play it. Streaming media servers may also account for the transmission bandwidth and capabilities of the media player. Unlike the web server, the streaming media server communicates with the user computer using control messages and data messages to adjust to changing network conditions as the video is played.

Streaming media can be categorized to include streaming of pre-recorded events or live events. In the case of pre-recorded events, the user computer may provide control messages including commands for trick play functions such as fast forward, fast reverse, pausing, or seeking to a particular part of the media program. In the case of live events, the media program is provided in essentially real time, and the user computer may be incapable of providing control messages for trick play functions (e.g. the media stream is simply provided to the user device for presentation to the user as it is received), or the user computer may be capable of providing limited control messages (e.g. to permit pausing and rewinding to information). Streaming media servers can also multicast, which allows more than one client to tune into a single stream, thus saving bandwidth.

Although beneficial in many respects, the streaming of media programs is not without disadvantages. The cost to develop and maintain a system capable of streaming high resolution media programs to large numbers of users at a time is high, and requires a substantial infrastructure to develop and maintain. Content providers can avoid the infrastructure difficulties by contracting with third party media streaming entities such as AKAMAI to provide streaming media services for their media programs, but the cost of such streaming remains high, and typically, the cost of such streaming by such third party streaming entities is unrelated to the content of the media being streamed. Hence, whether the content being streamed is actual media program itself or simple text, the cost is the same.

In some cases, the media programs requested by the user are "blacked out" or otherwise unavailable due to licensing rights or other concerns. For example, the media program may be a live broadcast of a National Football League (NFL) game that is available for transmission to devices across most of the country, but not devices in the geographic are near where the NFL game is being played. In this circumstance, the NFL game is said to be "blacked out" in this geographic region.

In another common example, the media program may be a program such as "The Simpsons" which is broadcast at the same time within a plurality of time zones (e.g. 7 PM Eastern Standard Time (EST), 7 PM Central Standard Time (CST), 7 PM Mountain Standard Time (MST, and 7 PM Pacific Standard Time (PST)). In this instance, the content provider (or its regional affiliates) will first broadcast the SIMPSONS episode at 7 PM EST for reception by televisions or set top boxes in geographical area within the EST time zone, but not to televisions or set top boxes in other geographical areas. Such a broadcast may be regarded as a "regional premier," because although it is not truly live (e.g. reflecting an actual event such as a sporting event as it happens), it is only available in each of the time zones at the appointed time.

If the SIMPSONS episode were available to be streamed to devices in any of the foregoing time zones, users in those time zones may view the SIMPSONS episode via streaming before they can view it by broadcast from the regional affiliate. Because this may deprive such users' regional affiliates of the revenue derived from such broadcast, it is desirable for the content provider to "black out" the streaming of the episode of the SIMPSONS to users located in any time zone temporally following the EST time zone.

In either of the foregoing cases, the streaming media server is typically configured to stream a message to the user indicating that the live media program has yet to begin or is not available to the user (i.e. NFL regional blackouts). For example, if a media consumer in the Pacific time zone (PST) requests streaming of the SIMPSONS at 6:50 when the live streaming is to commence at 7 PM PST, they will not be presented with the requested episode of the SIMPSONS, but rather, a streamed message indicating that the requested episode of the SIMPSONS is not available. Further, the same streamed message is provided to all customers in the blacked out time zones, regardless of what their interests may be.

If the content provider is using a third party streaming entity to stream this message, they are typically being billed for the streaming of the message, just as they would be if the streaming of the live media program had begun. As a consequence, the content provider pays for streaming services that are not fully utilized, and the viewer is presented with a simple screen that does little more than tell them that the live media program has yet to begin.

The advent of mobile media program players further exacerbates the problems in dealing with media program blackouts. Since the viewer may be using in a mobile device in an automobile traveling at highway speeds, it is possible for the user to begin watching a media program in a geographic location that does not invoke a blackout restriction, move to a geographic location that does invoke a blackout restriction, then later move to another location that does not invoke a blackout restriction.

It is possible to discourage viewers from tuning to blacked out media program, for example, by providing an electronic program guide (EPG) that indicates that the media program is blacked out. Other user interfaces may present media programs in "collections," with each collection having a subset of available programs. Collections may be organized by category, for example, one collection may be the subset of media programs in the "sports" category. Special content may be highlighted within categories, for example, live content may be indicated at the top of programs in the sports collection. These collections may be intelligent, so if a media program in the collection is unavailable to the user (e.g. because of a blackout restriction) that media program will not be shown in the collection. However, this solution is not useful in situations wherein users may request or tune to the channel (or URL) of the media program independently from an EPG, or when the user moves into and out of the blackout area while watching the media program (and without consulting an EPG). Since the blackout information is presented only in the EPG, the viewer in such situations will be presented with little or no information, and such information will be streamed to the user, adding to the content provider's costs. Further, EPG-gate keeping based solutions are ineffective when the blackout status of the program changes over time, whether due to motion of the device used to view the media program, or for other reasons.

There is therefore a need to implement blackout restrictions in a way that minimizes transmission throughput requirements (and related costs) and provide some modicum of information and direction to viewers who have encountered the broadcast restriction when attempting to view a media program of interest.

SUMMARY

To address the requirements described above, this document discloses a system and method for managing streaming of a regionally premier media program to a device. In one embodiment, the invention is embodied by a method comprising: (a) receiving a request to stream the media program to the device, the request comprising: an identifier of the media program; a location of the device; and a user identifier; (b) in response to the received request, determining a current transmission state of the media program to the device at the location according to the identifier of the media program and the location of the device, the current transmission state comprising: a first current transmission state where streaming the media program to the device is not precluded and a second current transmission state where streaming of the media program to the device is precluded; and (c) in response to a determination that the current transmission state is the second current transmission state: terminating any streaming of the media program to the device and transmitting second information in lieu of the streaming of the media program, the second information initiating presentation of alternative content by the device.

In various embodiments, the method determines the second information according to the identifier of the media program, the user identifier, and the location of the requesting device. In another embodiment, the second information excludes streamed data and is transmitted by a web server. In still another embodiment, determining the current transmission state of the media program to the device comprises: comparing the identifier of the media program and the location of the device to an entitlement map, the entitlement map relating the current transmission state to entitlement map parameters comprising: identifiers for a plurality of media programs including the requested media program; identifiers for a plurality of users including the identifier of the user; rules for streaming the media programs including the requested media program, comprising: blackout rules, the blackout rules defining conditions precluding the streaming of the plurality of media programs including the requested media program to one or more geographical regions; program guide data, including a schedule for streaming of the plurality of media programs including the requested media program to a plurality of regions including a region comprising the location of the device; and determining the current transmission state according to the entitlement map.

Another embodiment is evidenced by a system of managing streaming of a regionally premier media program to a device. The system comprises a web server for receiving a request to stream the media program to the device, the request comprising: an identifier of the media program; a location of the device; and a user identifier. The system also comprises a transmission state analyzer, for determining, in response to the received request, a current transmission state of the media program to the device at the location according to the identifier of the media program and the location of the device, the current transmission state comprising: a first current transmission state where streaming the media program to the device is not precluded; a second current transmission state where streaming of the media program to the device is precluded. The system also comprises a stream controller that, in response to a determination that the current transmission state is the second current transmission state, terminates any streaming of the media program to the device; where the web server transmits second information in lieu of the streaming of the media program, the second information initiating presentation of alternative content by the device.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout:

FIG. 4 is a diagram presenting an exemplary embodiment of an entitlement map;

DESCRIPTION

Figure 1:
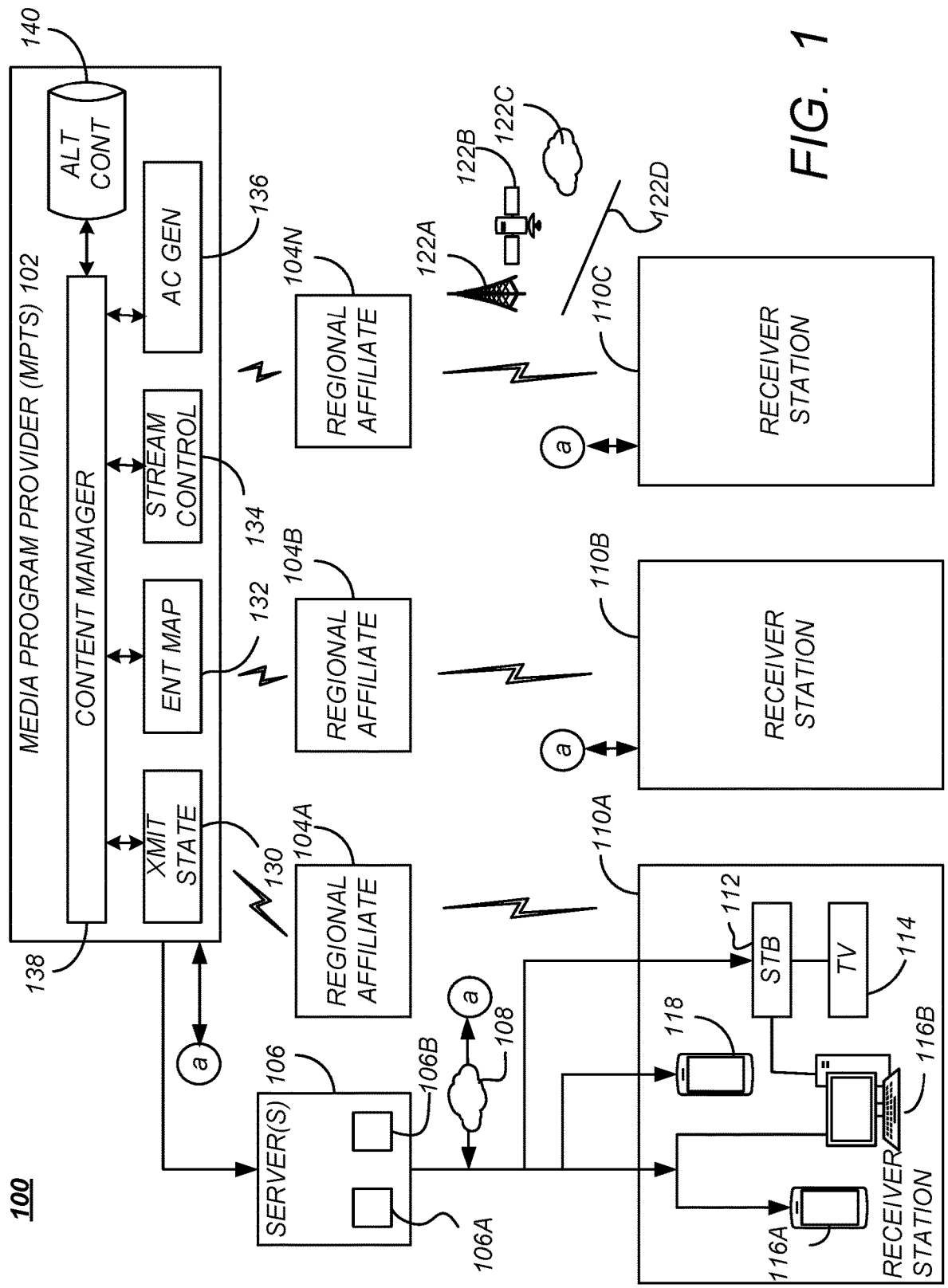
FIG. 1 is a diagram of a content delivery system with an integrated viewer network

In the following description, reference is made to the accompanying drawings which form a part hereof, and which is shown, by way of illustration, several embodiments. It is understood that other embodiments may be utilized, and structural changes may be made without departing from the scope of the present disclosure.

Overview

As described above, the streaming of live content also broadcast by conventional television channels often has restrictions which require blacking out sections of the content for a segment of streaming viewers. This can occur, for example, when a local station does not have rights for Internet distribution of the program they are airing, regional blackouts of sports programming, contractual requirements preventing distribution on specific platforms (i.e. NFL on Mobile) and the preemption of regularly scheduled programming by content without Internet distribution rights. This also may occur with "bonus" channels and streams of a sporting event that are only available from a digital feed, but have the same restrictions as the media program they are associated with. The traditional method of addressing this is to stream video showing an informational slate. The problems with this traditional solution are:

(1) streaming video costs money, while the information displayed on the slate may be static, there are transmission costs associated with streaming the slate for the duration of the blackout to all viewers seeing it;

(2) it is expensive to generate unique slates for each scenario where a blackout is necessary and to personalize the slate for different users and devices; and (3) streaming a slate as video means it cannot be interactive. As the viewers are watching the content on interactive devices, there is an opportunity to deliver an interactive experience rather than passive streams on such as mobile phones, tablets, set top boxes, and interactive TVs With the solution presented below, when the viewer attempts to connect to a live streaming (or video on demand (VOD) content which is being released at a specific date and time) feed which is in blackout, rather than start the feed, the client application should detect this and instead display an interactive user interface (UI) on the client device. The UI can include any of the following elements:

1. Branding of the network, station, upcoming program, or advertisers including animated elements. For example, the network or regional affiliate may be shown with upcoming programs and advertisements.
2. Information displaying that the channel is in blackout, why it is blacked out, and when it will become available, including an optional a countdown clock to when playout will resume
3. Directions where the viewer may be able to go to watch the blacked out content (i.e. for example, a URL of another source where the user can stream this content.
4. Electronic Program Guide (EPG) showing upcoming programs which will be streaming in the video or streaming channel of the requested media program.
5. Video playback of promotional content, video advertisements, or other programs—this could occur in a small window or full screen with the informational content being overlaid.
6. The ability to set a reminder to automatically notify the viewer that the live content is starting or to automatically switch to the live content when it starts if the viewer leaves the slate.
7. Recommendations of other related programming the viewer may want to watch or purchase while waiting for the live stream to resume. The UI can be configured, for example, to present only recommended programs that will be completed before the blackout is lifted.
8. Interactive games, advertisements, and promotions.

Any of the elements listed above can be dynamically controlled on a per-device basis based on the viewer's location, identity, device, time of day, and preferences.

In one embodiment, once the blackout ends and the live stream resumes, the player automatically transitions from the interactive slate to the live stream. If the viewer has left the slate, but has indicated they want to be notified when the blackout ends, a message can be displayed in the player providing a link to join the live stream. If the viewer has left the slate and has indicated they want to automatically join the program when the live stream starts, the player would automatically transition the viewer to the live content when it becomes available.

Conventions

In the following discussion, the following conventions are used:

Media program: A television show, typically comprising video and audio information. The media program may stand by itself or depict an event or group of events that occur as a part of a sequence of events. For example, a media program may consist of a movie, or an episode of a series of episodes (as described further below).

Series: A plurality of media programs that depict a group of related events that together present a story or contest. In one embodiment, the series includes a serialized story, with each installment of the story presented in temporal order according to the story depicted in the series. In another embodiment, the series depicts a group of related events that are not serialized in temporal order. One example of such a series is "THE SIMPSONS," where each event or episode is related in the sense that the characters are chosen from the same cast of characters, but not serialized in temporal order.

Episode: One of the series of media programs that together comprise a series. For example, a media program depicting an installment of the FOX television series "SO YOU THINK YOU CAN DANCE" is referred to as an episode. In some cases, the group of serially related events include only those broadcast or to be broadcast during a broadcast season. For example, a series may be defined to include a single season of episodes of "SO YOU THINK YOU CAN DANCE," that is, a series depicting a closed set of contestants until a winner is determined. Or, a series may be defined to include all of the episodes of the series across all seasons.

Syndication: Syndication refers to the sale of the right to transmit media programs created or managed by a media program provider. Typically, such transmission is performed by independent affiliates that are often associated with a particular geographical area.

Live: As used herein, a "live" transmission of content constitutes content that is transmitted substantially at the same time that it is created. Hence, a live media program is a media program transmitted with no intentional delay, save for a possible slight delay to allow the content to be reviewed for potential censorship if necessary. Live content transmissions are also typically transmitted at the same time to viewers in all regions where will ultimately be transmitted at substantially the same time. One example of a live program would be a football game, transmitted (except for a short delay of several seconds) as it happens.

Premier: Premier content is content that transmitted for the first time. All live content is premier content (as it cannot have been transmitted before it was generated), but not all premier content is live. For example, a pre-recorded episode of a media program may be broadcast for the first time at 8 PM Eastern Standard Time would be premier content.

Regionally Premier: Regionally premier content is content program that, while it may or may not be truly premier content in the sense that it is being transmitted for the first time. It is content that is transmitted for the first time in that region, and hence, "premier" for that region. It is not globally premier, however, unless it is regionally premier in the first region is broadcast to. Regionally premier content is only truly "live" when transmitted to the region substantially as it happens. Hence, regionally premier programs may be prerecorded. For example, THE SIMPSONS may be scheduled to be broadcast by conventional wireless means by regional affiliates of FOX at 7 PM local time every Sunday. So, when a particular episode of THE SIMPSONS commences in Eastern Time Zone at 7 PM, that episode is said to be regionally live in that time zone. Streaming of that media program to devices in that time zone will not commence until 7 PM and will end at 8 PM, essentially synchronized with the transmission of the same episode by traditional wireless broadcast means. Regionally premier content may also include a temporal component. For example, in some instances, it may be beneficial to enforce a blackout on a rebroadcast of a media program, if a commercially significant amount of time has passed since the premier broadcast in that region. One example would be the regional premier of a particular episode of THE SIMPSONS may be on a particular date, with blackout enforced on a rebroadcast of that particular episode on a later date when there is commercial value in the rebroadcast. This may occur, for example if the regionally premier content was first broadcast long ago, or has been unavailable on demand for a significant period of time.

HTTP Live Streaming: Hypertext Transfer Protocol (HTTP) live streaming (otherwise known as HLS) is a streaming protocol that typically creates multiple versions of the media program, each suitable for transmission over channels having different bandwidth. Each version is broken up into "chunks." A requesting device is given a playlist having identifiers for retrieving a chunk of the media program from among the different versions. Therefore, the receiving device can adapt itself to different channel bandwidths by simply choosing to request smaller (and lower quality) chunks when necessary, and larger (higher quality) chunks when the bandwidth comes available. While termed "live streaming," the underlying content may or may not be live, and not all live content is transmitted by HTTP live streaming. For example, live content (as well as other content) may be transmitted by HTTP Dynamic streaming (known as HDS), MICROSOFT smooth streaming (used with SILVERLIGHT), Dynamic Streaming over HTTP (DASH), and SHOUTCAST.

Content Delivery System

FIG. 1 is a diagram of a content delivery system (CDS) 100 with an integrated viewer network. A media program provider 102 creates or obtains media programming such as television shows, which may have a plurality of episodes or editions. Such media programs are provided to local or national affiliates 104A-104N (hereinafter, "affiliates") who, for a licensing fee provided to the media program provider 102, rebroadcast the media programs via medium 122 (which may include terrestrial wireless 122A, satellite 122B, or cable 122C, or Internet 122D transmission) to receiving facilities or stations 110A-110C (hereinafter alternatively referred to as receiver station(s) 110) with their market. Media program provider 102 also transmit information, including alternative content to the receiver stations 110 via medium 122. As described further below, the media program provider includes a content manager 138 communicatively coupled to a transmission state analyzer 130, an entitlement map 132, and a stream controller 134, alternative content generator 136 and an alternative content database 140. The content manager 138 interfaces with the transmission state analyzer 130 to determine the transmission state of media programs, using the entitlement map 132. The content manager 138 also interfaces with the stream controller 134, which interfaces with the streaming server 106A to initiate, perform, and terminate the streaming of media programs, and with an alternative content generator 136, which generates information used to present alternative content, and may generate the alternative content itself. Data used to generate the alternate content may be stored in alternative content database 140 for retrieval. Some of the foregoing elements may be disposed at different locations, and may be managed by third parties. For example, the stream controller 134 may be part of the streaming (media) server 106A.

The receiver stations 110 may comprise a monitor or television 114 for viewing the media programs provided by the media program provider and transmitted by the associated regional affiliate 104. In ordinary broadcast embodiments, the display device 114 includes electronics and processing required to receive the signal transmitted by the regional affiliate 104. In other embodiments, a set top box (STB) 112 or similar device receives the signals and provides them to the display device 114 such as monitor or television for viewing. Receiver stations 110 may also comprise a smartphone 116A or a home computer 116B such as a desktop, laptop, or tablet computer.

Typically, the license that is provided to the regional affiliates 104 to transmit the media program to subscribers or viewers preclude the media program provider 102 from providing any portion of the media programs by a means independent from the regional affiliates to their market in a way that would compete with that of the regional affiliate 104. Each affiliate's "market" may be defined by a geographical area in which the signal from the affiliate may be received. For example, in the case of a terrestrial transmitter, the "market" may be the area in which the terrestrial transmitter's signal may be received at the receiver stations 110. In the case of a satellite transmitter, the satellite 122B may use spot beams to limit transmission of the signal to particular geographical regions. "Markets" may also be determined by the status of the consumer, for example, the market may be defined to include a person that is provided access to the transmitted program, regardless of their location (e.g. persons who have subscribed to a particular media service).

For example, in the past, media program providers 102 typically did not stream media programs via the Internet at the same time that a regional affiliate 104 may be broadcasting the same media program, because such a transmission would compete with the transmission from the regional affiliate 104. Transmission of the same media program after a "premiering" transmission by the regional affiliate 104 is less problematic, as such re-broadcast does not compete with the "premiering" transmissions by the regional affiliate 104. In this context, "premiering" refers to the first broadcast of the media program in the market or area, whether or not the broadcast is truly live (e.g. broadcast in real time as the subject matter of the media program occurs).

The CDS/integrated viewer network 100 also comprises a server element 106 that can comprise one more servers such as media server 106A and web server 106B. Media server 106A can be used by the media program provider 102 to transmit or stream media programs to the receiver stations 110 as well as the alternate content described further below. Web server 106B communicates commands and other information between the media program provider 102 and the receiver stations 110, including user alternative content, as described further below.

The media server is a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player. Unlike the web server, the streaming media server communicates with the user computer using control messages and data messages to adjust to changing network conditions as the video is played. These control messages can include commands for trick play functions such as fast forward, fast reverse, pausing, or seeking to a particular part of the file. Since a streaming media server transmits video data only as needed and at the rate that is needed, precise control over the number of streams served can be maintained. Unlike the case with progressive downloading, the viewer will not be able to view high data rate videos over a lower data rate transmission medium. However, streaming media servers (1) provide users random access to the video file, (2) allows monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

The media programs and advertisements may be delivered according to any suitable protocol, including the hypertext transfer protocol (HTTP), transmission control protocol (TCP), user datagram protocol (UDP), real time transport protocol (RTP), and real time streaming protocol (RTSP). TCP, RTP and RTSP all provide information to the sender of the media program information regarding the transmission of the media program to a user device at the receiver station 110.

RTP uses a real time control protocol (RTCP) which is used for session control and includes receiver reports having reception statistics from participants. RTCP is used to gather statistics on the quality of the transmission of the media program during the session and transmit this information to session source (e.g. the media server 106A) to enable adaptive media encoding. RIP is more fully described in "RTP: A Transport Protocol for Real-Time Applications," by H Schulzrinne et. al, July 2003 (available at http://tools.ietf.org/html/rfc3550), which is hereby incorporated by reference herein.

RTSP uses control messages sent by the client to the server to control the transmission of data to the client. For example, RTSP defines a speed request header field that requests that the media server deliver the data to the media program player at a particular speed, consistent with the media server's ability and desire to provide the media at that speed.

TCP uses an end to end flow control protocol in which the receiver of the data specifies, in a receive window field, the amount of additional data that it is willing to buffer. The sender then sends only up to that amount of data and will not send more unless the sender receives an acknowledgement message and another update in the window field. If the receiver specifies a zero window field, the transmitter stops sending data and starts a persist timer. The TCP sender will attempt recovery by sending a small package.

HTTP Live Streaming (HLS): In this protocol, when the receiver station 110 requests the media program, it is provided with a "playlist" of small segments or "chunks" of the media program. The user device uses the playlist to request transmission of each chunk of the media program in order, and when each chunk is received, it is processed and assembled into the media program presented to the user. Typically, the receiver station 110 transmits a request for the program identifier (PID) of the media program to a feed service. The request typically comprises a user ID or a proxy thereof, as well as some identification for the media program. The feed service receives the request, and obtains the PID of the requested media program, using information obtained from a content metadata/streaming information database. The PID is then transmitted to the receiver station 110. The receiver station 110 then transmits a media program request with the PID to request the media program. In this embodiment, the media program is broken up into a plurality of segments or "chunks" that can be transmitted to the receiver station 110 upon request from the receiver station 110. Which segments to request and the order to request them is determined by a segment playlist that is transmitted from the media program provider 102 to the receiver station 110.

Each "playlist" is optimized for certain transmission characteristics (some require higher transmission bandwidth than others), and the receiver station 110 uses the playlist to request transmission of each chunk of the media program in order. If the current transmission bandwidth is insufficient, the receiver station can request segments that are of lower resolution and require less bandwidth via the appropriate "playlist". Each chunk of the media program or advertisement is received, processed, and assembled into the media program presented to the user.

The alternative content may be transmitted and reproduced using the STB 112 and/or the TV 114, or may be presented on the secondary devices 116 such as the smartphone 116A, or the home computer 116B. Communications between the servers 106 and the receiver station 110 may be provided via any suitable transmission medium including the Internet, Wi-Fi, a 3G, 4G, long term evolution (LTE) or 5H cellphone network, text network, cable, satellite or similar transmission medium. Return communications from the receiver stations 110 may be provided via the secondary devices 116A, 116B, alternate device 118 such as a cellphone, or the STB 112 using either the same communication medium used to transmit the streamed media or alternative content, or a different medium 108. For example, the media server 106A may stream media programs and transmit alternate content to the receiving station 110 via the Internet, yet receive user input (e.g. votes or selections) via a 4G or paging network using a smartphone as the secondary device 116 via web server 106B or medium 122. The web server 106B may also transmit the alternative content to the STB 112 of the receiver station 110, for presentation by the display device 114.

The alternate content may be transmitted via one or more servers under the control of the regional affiliates 104A or by servers under control of the media program provider 102. For example, the alternate content may be available at a URL of a website controlled by the regional affiliate 104 or the URL of a website controlled by the media program provider 102.

Figure 2A:
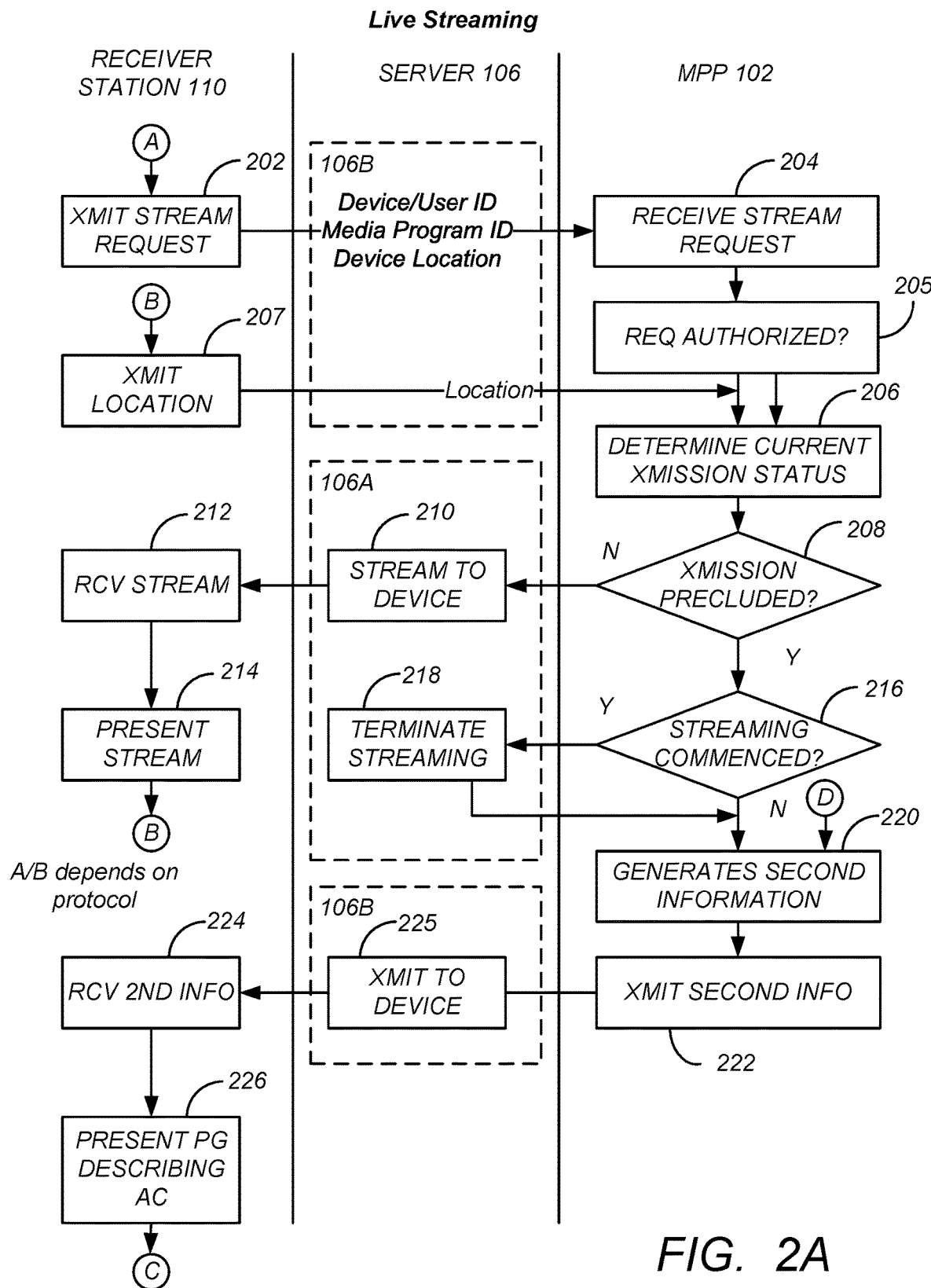
FIGS. 2A and 2B are diagrams illustrating exemplary operations that can be performed to provide alternative content in situations where transmission of a requested media program is precluded.
Figure 2B:
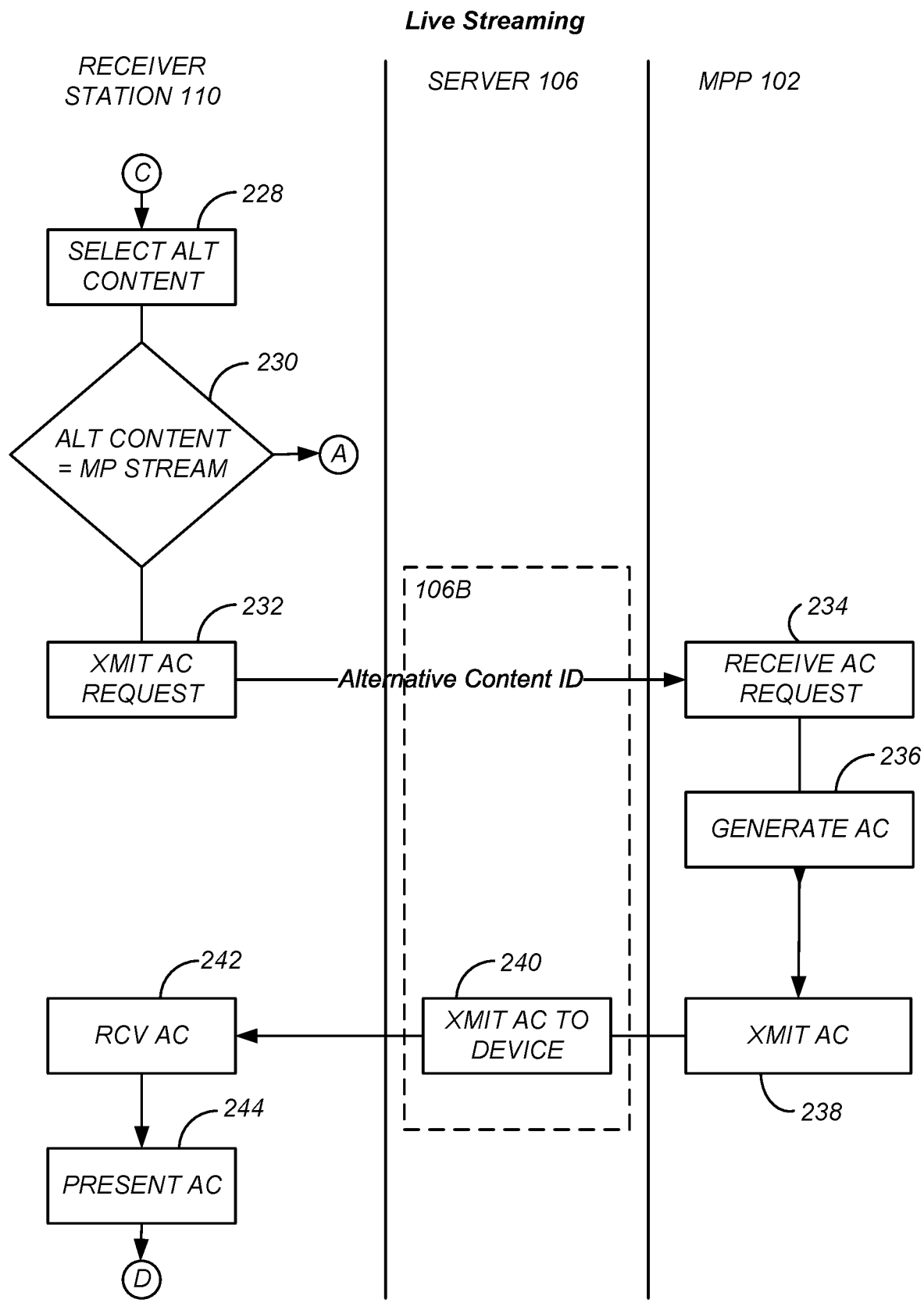

FIGS. 2A and 2B are diagrams illustrating exemplary operations that can be performed to provide alternative content in situations where transmission of a requested media program is precluded, for example, by a blackout.

In block 202, the receiver station 110 transmits a request to stream a media program to the receiver station 110. This is typically accomplished by transmitting the request to the web server 106B via a device at the receiver station 110, typically the device that will be used to receive the media program stream. Requests can be provided to the web server 106B by the receiver station's internet service provider (ISP), which may be via digital subscriber line (DSL), cable, satellite, or cellphone network. The request to stream the media program may be transmitted via an Internet browser or an application installed on the device at the receiver station 110.

The request includes an identifier of the requested media program, or media program ID. Typically, the request or data transmitted appurtenant to the request includes a user identifier or device identifier and/or the current location of the receiver station 110.

Determining the Location of the Receiver Station

The location of the receiver station 110 can be determined using a variety of techniques and sources of location information. Such sources of location information may include the known location of devices used to communicate information to the server 106 or elsewhere.

Such devices may include Wi-Fi devices used in a Wi-Fi positioning system (WPS). WPS is a geolocation system that uses the characteristics of nearby Wi-Fi hotspots and other wireless access points estimate where a device is located. Location information can be derived by comparing signal strengths at different Wi-Fi hotspots and using triangularization, or by using phase or time of arrival changes as a signal arrives at different Wi-Fi hotspots If only rough location accuracy is required, the fact that the signal from the receiver station 110 is being serviced by a Wi-Fi transceiver in a known location may well be enough to sufficiently locate the receiver station 110 location. The location of the Wi-Fi transceiver may be determined from its network identifier or service set identifier (SSID) or the IP address on which it communicates.

Such devices may also include BLUETOOTH tracking using devices compliant with Bluetooth 4.0 or 5.1, using Bluetooth beacons to determine position. In a client based system using Bluetooth beacons, the receiver station 110 may receive signals from Bluetooth beacons installed in the building, and use signal strength to determine the relative location. This information can be transmitted elsewhere for further processing, or processed by the receiver station alone. This can result in accuracies of about 1-3 meters for devices within a range of about 30 meters of the Bluetooth beacons. In a server-based system using Bluetooth beacons, the beacon is included with the receiver station 110, and the beacon transmits BLE signals to locator nodes that are installed in different locations. The signal received at each location is used to determine the location of the beacon and can produce location accuracies in the order of 8 meters or less when using Bluetooth 5.1 at ranges up to 75 meters. Of course, such accuracies are not required to determine the receiving station 110 location for the purposes presented herein, as such purposes generally only require that the location of the receiver station 110 be known to permit a determination if other content should be provided instead of the requested streamed content. Future Bluetooth versions may permit position determination to even greater accuracy or with fewer system requirements.

In other embodiments, the physical location of the receiver station 110 is determined at least in part using the Internet Protocol (IP) address associated with the transmitted request, which can be roughly associated with physical location.

In still other embodiments, the receiver station 110 location is determined at least in part by a Global Positioning System (GPS) receiver disposed at or proximate the receiver station 110. Such GPS receivers are included with many smartphones, for example.

In still other embodiments, the receiver station 110 location is determined at least in part from the physical location of a cellphone tower with which the receiver station 110 is communicating the request or the streamed data.

The foregoing techniques can also be used in combination. For example, a cell tower location can be used to determine the receiver station 110 location when mobile, and Wi-Fi SSID can be used to closer estimate the location of the receiver station 110 if available. If greater accuracy is required, the GPS receiver of the receiver station 110 may be activated to provide further accuracy, or to confirm results obtained from cellphone tower and/or Wi-Fi SSID information.

Further, the determination of the location of the receiver station 110 may take place solely on the client side (receiver station 110), on the server 106 side, or the computations completed in making the determination may be shared between the receiver station and the server 106. For example, the receiver station 110 could receive information describing the signal strength from other entities such as Wi-Fi SSID devices, and transmit that information to the server 106, which can use a database of SSID device locations to triangulate if necessary and determine the receiver station position. The receiving station 110 may also simply transmit the SSID of the Wi-Fi transceiver it is communicating with, and that information may be used to determine the receiving station 110 location.

In some embodiments, it may also be advisable to have the location of the receiving station 110 determined at both the receiving station 110 and the server 106. For example, the receiver station 110 may report their location by reporting the SSID of the Wi-Fi transceiver it is using to communicate with the server 106, but the server 106 may also examine the IP address of the Wi-Fi transceiver or the receiver station 110 and confirm that the resulting locations are consistent. This could be used to identify receiver stations 110 that might be attempting to spoof their location or their identity. The server 106 may also instruct the receiving station 110 to activate a GPS module of the receiving station 110 and transmit the resulting raw data or location determination, again to confirm that the results are consistent with other means for determining the location of the receiving station 110. Activating the GPS module can be accomplished for example, by an application running at the receiver station 110, which either automatically activates the GPS module or does so with the permission of the user.

In further embodiments, the server 106 may make a server side determination of the location of the receiver station 110 (e.g. using the IP address), but to request that the receiver station 110 perform additional operations so that this determined location can be confirmed. This could be useful for receiving stations 110 that form a part of known virtual private networks as this could indicate that the user of the device is attempting to obscure their actual location through the use of a virtual private network (VPN).

Further, some client (receiver station) side implementations of location services may provide metadata to indicate if the device's actual location is being determined through client side methods (such as a mock locations on an ANDROID device). If such client-side method is detected, the server 106 may revert to server-side methods of location determination (i.e. IP address) even if the client is providing client-side location data.

Returning to FIG. 2, in block 204, the media program provider (MPP) 102 receives the request to stream the media program to the receiver station.

In some cases, the streaming of a media program to a device at the receiver station 110 may require verification of the identity of the user making the request before the streaming of the media program can commence. For example, this may be the case if provision of the media program is subject to a valid user subscription to the services of the media program provider. Block 205 determines if the device or user making the media program request is authorized to receive the media program.

In one embodiment, the user is typically prompted to enter credentials demonstrating that they are a subscriber to the desired media program. Such credentials may exist by virtue of either a subscription to a content provider (e.g. FOX) associated with the media program or subscription to a service provider that provides access to media programs from a plurality of content providers (for example, DIRECTV).

The interface in which the credentials are entered may be provided by a dedicated URL or application of the media program provider 102. The user enters their credentials, and the user device transmits the credentials to the media program provider.

In one embodiment, the credentials are entered into the media program provider's website or application executing on the device, and provided to the media program provider 102 for validation. The media program provider 102 may then indicate whether the user's credentials are valid by transmitting an appropriate message to the user device. If the credentials are indicated as valid, processing is routed to block 206.

If the request is not authorized, a message may simply be sent from the media program provider 102 to the device at the receiver station 110 indicating that the request is not authorized. In one embodiment, the message may also include an offer for the user to register to become authorized to receive the requested media programs and/or other media programs from the media program provider 102. In another embodiment, processing is passed to block 220 which generates second information for the user's request, in this case, media programs or other materials that can be obtained without further authorization, providing the requesting user with alternative content that can be streamed without registration with the media program provider 102.

The MPP 102 determines the current transmission status of the requested media program, as shown in block 206. This can be accomplished by the transmission state analyzer 130 using the entitlement map 132, as further described below.

Figure 3:
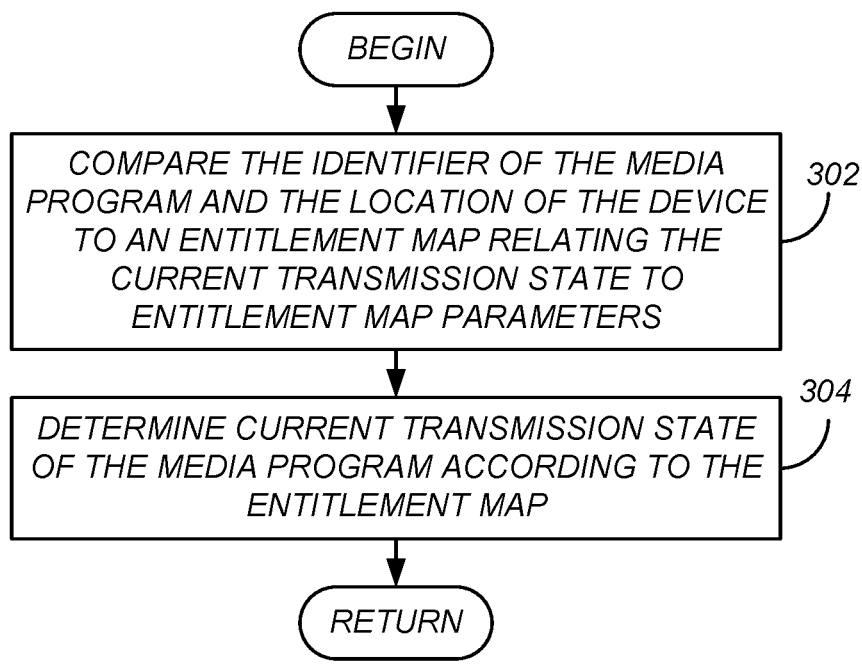
FIG. 3 is a diagram illustrating one embodiment of how the media program provider determines the current transmission status of the requested media program.

FIG. 3 is a diagram illustrating one embodiment of how the MPP 102 determines the current transmission or streaming status of the requested media program. In block 302, the identifier of the requested media program and the location of the receiver station 110 is compared to an entitlement map having entitlement mapping parameters that relate the current transmission state of the requested media program to entitlement map parameters. In block 304, the current transmission state of the media program is determined according to the entitlement map.

FIG. 4 is a diagram presenting an exemplary embodiment of an entitlement map 132. The entitlement map includes entitlement map parameters, which may include a number of different data structures and formats.

The entitlement map 132 includes identifiers for each of a plurality of media programs including the requested media program (media program IDs) (402). The entitlement map 132 may also include an identifier of each of a plurality of regions where the media program is shown (region ID) 404. As shown, the defined regions may include regions determined by time zone, municipal area (e.g. metropolitan Los Angeles), postal zone, geopolitical boundary (e.g. county or state), or any other region. Defined regions may overlap. For example, a particular time zone typically includes a large number of postal zones, and a metropolitan area may include a portion of two or more counties or states. Use of multiple region definitions permits blackout areas to be defined with different levels of precision as desired.

The entitlement map 132 may also include entitlement data 406 defining the requirements for a particular user or group of users to be provided access to a particular media program. Entitlement data may include, for example, data indicating whether the user has subscribed to a service that provides the media program, and/or whether the user is of sufficient age to view the media program. Enablement data may also be used to implement pay-per-view functionality.

The entitlement map 132 may also include rules data 408 describing rules to be applied to determine if the transmission of a media program is precluded. The rules data 408 includes blackout rules that define conditions precluding the streaming of the plurality of media programs including the requested media program to one or more geographical regions.

Rules data 408 may be defined as a Boolean combination of conditions. For example, a rule may simply specify that a particular media program cannot be streamed to devices within a particular area within a particular time frame. As another example, another right condition may restrict video quality to specific levels based on the receiving device or subscription package (for example, 4K resolution may only be available on specific display devices or only with a premium tier subscription. The Boolean conditions may also provide for exceptions, for example, permitting the media program to be streamed into a certain region during the blackout time if the user or device meet some other requirement, for example, that they are a subscriber to the regional affiliate that is otherwise the cause of the blackout. Using such Boolean logic, reasonably complex rule structures can be defined using the data in the entitlement map.

The entitlement map 132 may also include a plurality of user IDs 410 that identify the users. Alternatively or in addition to the user ID 410, a device identifier (device ID) may be used.

The entitlement map 132 may also include a plurality of template identifiers 412. Templates are used to personalize the program guide provided to each user. For example, the user may have selected a program guide configuration that includes only program guide information regarding other media programs currently available for streaming, and not other media types such as social media portals (e.g. FACE-BOOK, TWITTER, or a portal to a social media system hosted by the media program provider 102 using communication paths labeled with a circle "a", chat groups, or video games. A program guide that presents only such data may be described by a particular template, and the fact that the person associated with that user ID 410 has selected that program guide configuration is reflected in the template ID 412 on in the entitlement map 132. The template may be described in terms of a markup formatted language such as the extensible markup language (XML).

The entitlement map 132 may also include a plurality of alternative content identifiers 414A-414N. Such alternative content IDs 414 identify alternate content that is suggested for the associated user ID 410 in the region defined by the region ID 404 when the media program identified by the media program ID 402 has been requested and is precluded from being provided because of a violation of the rules 408 or entitlements 406.

Returning to FIG. 2A, processing is passed to block 208, which determines if the transmission or streaming of the requested media program is precluded. If transmission is not precluded, processing is routed to block 210, and the streaming or media server 106A streams the requested media program to the receiver station 110. In block 212, the receiver station 110 receives the stream and in block 214, the receiver station 110 presents the stream to the user at the receiver station 110.

In one embodiment, processing is then routed to block 207. In block 207, the receiver station 110 again transmits information from which its location can be determined to the media program provider, and may also transmit the device/ user ID and/or media program ID. This is typically accomplished via communications using the web server 106B.

This feature supports mobile receiver stations 110 such as cellphones and the like, which may be moved to other locations while the media program is being streamed. Since a mobile receiver station 110 may be moved from a region where streaming of the media program is not precluded to a region where the media program is precluded (or vice versa), this feature both prevents the receiver station from receiving media programs when the receiver station 110 moves to a blackout region, and permits resumption of streaming of a media program when the receiver station 110 moves from a blackout region to a region where there is no black out.

It is possible that the receiver station 110 may spend only a short period of time in the blackout area. For example, a mobile receiver station 110 may travel through a particular zip code for only a few minutes. In such cases, it may be desirable to permit streaming, in cases where it has been determined that the receiver station 110 is moving and is within a certain distance of the region boundary. This will prevent media programs from being blacked out for only short periods of time. In another embodiment, streaming of the media program is permitted in such cases, but an application executing on a device at the receiver station 110 does not present the streamed media program until the receiver station 110 again enters a non-blackout region. In a further embodiment, the application continues to receive the streamed media program, and buffers (stores) it for the period when the receiver station 110 is in the blackout region, and then plays the media program from the buffer in a first-in-first out fashion, allowing the user to commence viewing the media program from the point the person entered the blackout region.

As described above, the transmission of the device location to the media program provider 102 may be implemented in an application executing on a device of the receiver station 110. For example, a cellphone device at the receiver station 110 may include a GPS module which provides continuous location information to the application. This information can be occasionally transmitted to the media program provider 102 on a period or aperiodic basis, or can be transmitted when the location of the receiver station 110 has changed by more than a particular amount. In some streaming protocols such as HLS, the receiver station 110 makes request for "chunks" of the media program every few seconds or so, and location information may be included with such "chunk" requests, or a subset of such requests.

Turning again to FIG. 2A, the media program provider 102 receives the updated location information, again determines the current transmission status as shown in block 206, and takes the actions described above on this basis.

If the determination of block 208 indicates that transmission of the requested media program is precluded, processing is passed to block 216, which determines whether streaming has already commenced (e.g. that the requested media program is already being streamed to a device at the receiver station 110). If so, streaming is terminated, as shown in block 218, and processing is routed to block 220. If not, processing is simply routed to block 220. This logic accounts for situations where the conditions for determining whether streaming of the requested media program have changed since the streaming of the program has begun. Typically, this would happen in embodiments with mobile receiver stations 110, but may happen for other reasons as well. For example, the entitlement map 132 may have been updated with new or changed engagement map parameters (for example, a new or changed rule, that the user's subscription has expired). These operations may be performed, for example, by the stream controller 134.

In block 220, the media program provider 102 generates second information. This may be performed, for example, by the alternate content generator 136 using data stored in the alternate content database 140. This second information is presented in lieu of streaming the requested media program. The second information may include, for example, the alternative content items 414A-414N such as media programs, described in the entitlement map 132 or information needed to generate the alternative content in the device at the receiver station 110A, and is presented or rendered in a program guide format according to a template. In an exemplary embodiment, the second information comprises a second media program comprising alternative media program related to the requested media program. For example, the system may switch from one stream to another (alternative content) in the scenario an affiliate must switch from one sporting game to another sporting game due to broadcast rights requirements.

The second information is then transmitted to the receiver station via the web server 106B, as shown in block 225. A device at the receiver station 110 receives the second information, as shown in block 224 and presents alternative content derived from the second information, as shown in block 226. The alternate content can include, for example, markup formatted language (e.g. language compliant with a markup language such as the extensible markup language XML) that is processed for rendering by the device at the receiver station 110. This can be accomplished with the use of a template associated with the user identifier.

Figure 5:
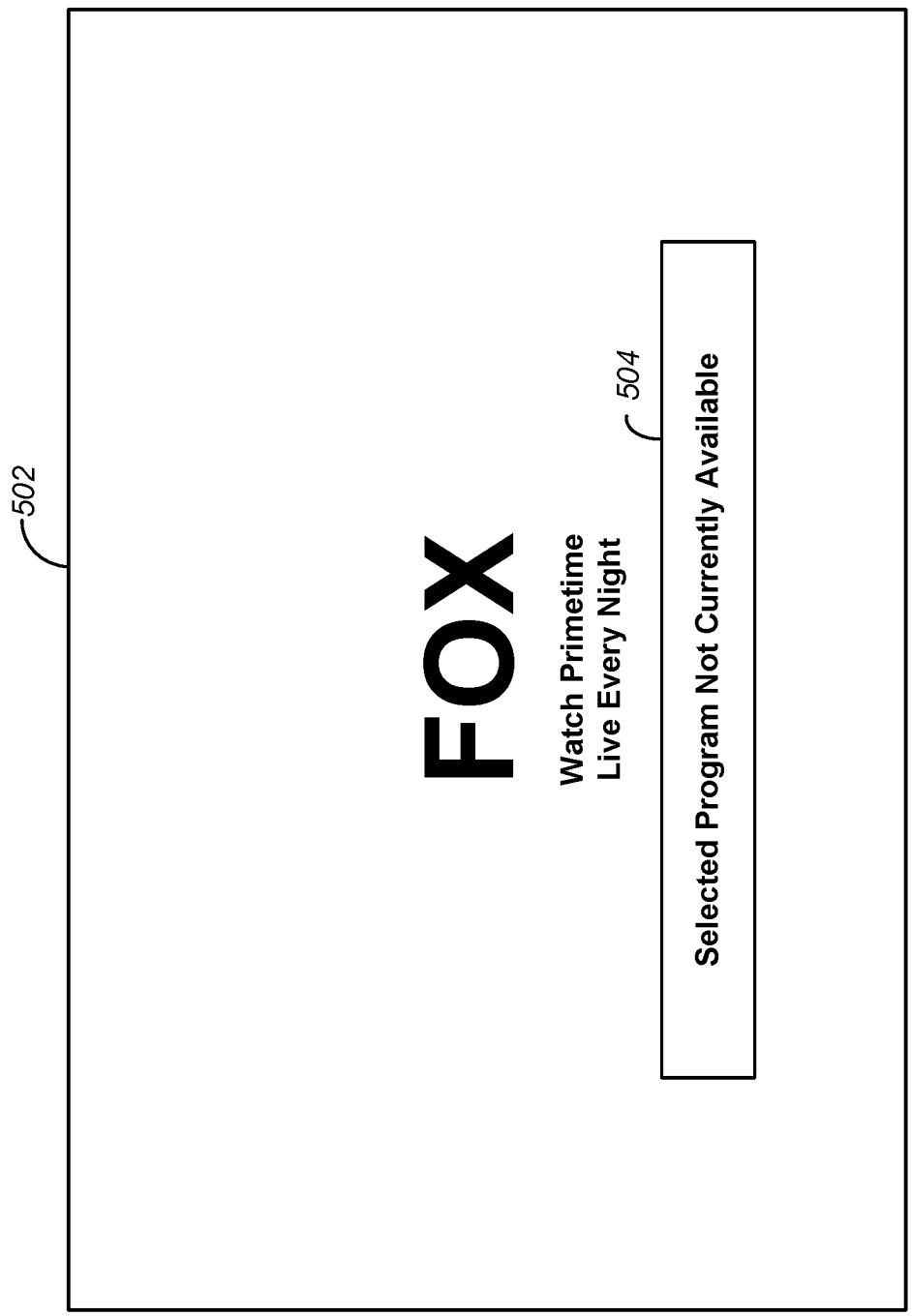
FIG. 5 is a diagram of an embodiment of such a message presented on a display of a device of the receiver station.

In previous systems, when a receiving station 110 requests a media program for which streaming is precluded to the user as violating a blackout restriction or other requirement, the media program provider 102 typically streamed a video comprising a message indicating that the requested media program was unavailable. FIG. 5 is a diagram of an embodiment of such a message 504 presented on a display 502 of a device of the receiver station 110. This message provides little information other than that the current media program cannot be streamed. Furthermore, the message is typically streamed as a part of a media program stream (e.g. video is presented with the message). This increases costs to the media program provider 102 because the streaming by the media server 106A itself is expensive, whether performed by the media program provider 102 or a third party, such as AKAMAI. Further, the same stream is provided to any receiving station that has requested streaming of the media program and for which such streaming is precluded.

Figure 6:
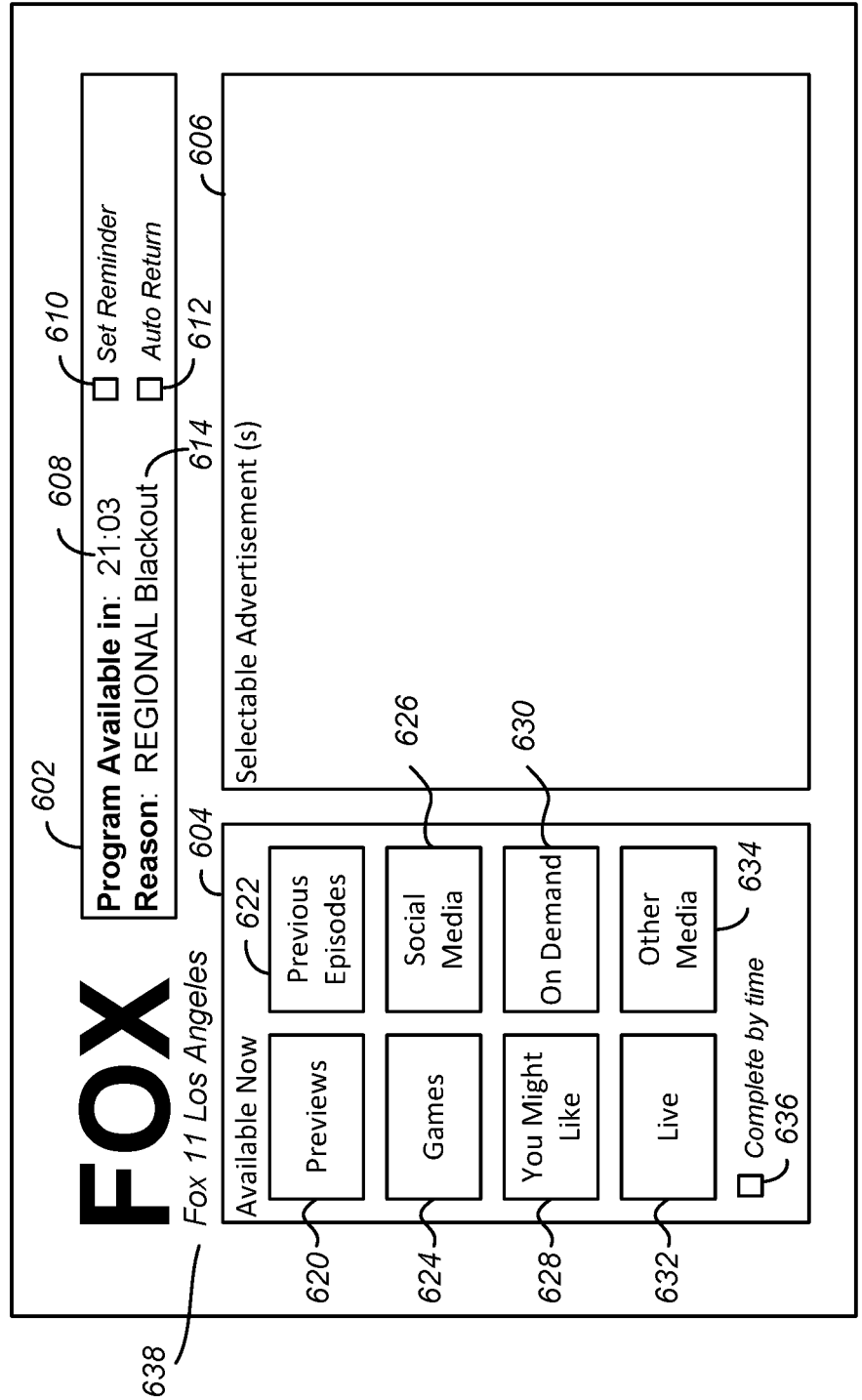
FIG. 6 is a diagram of a presentation of a program guide presenting alternative content prepared by the second information generated by the media program provider.

FIG. 6 is a diagram of a presentation of a dynamic slate having a program guide 600 presenting alternative content prepared by the second information generated by the media program provider in block 222. The program guide presents depictions such as images, icons, or text that are linked to the alternative content.

The illustrated program guide includes a banner window portion 602 having information regarding the requested media program and the blackout. For example, banner window portion 602 may include a countdown timer 608 indicating the elapsed time until the requested media program will become available to the receiver station. In embodiments wherein the receiver station 110 is stationary, this may simply be the countdown until the media program will be broadcast into the region of the receiver station 110 (and is therefore no longer blacked out). Other embodiments suitable for mobile receiver stations may compute an estimated time that the receiver station will enter a region where streaming of the media program is no longer precluded, and compute the countdown time from that data. Hence, a person in a moving automobile that requested the media program from a cellphone in an automobile may be informed they will leave the blackout region in a particular amount of time at their current speed. Countdown timer information is typically provided with the second information described above.

The banner window portion 602 also comprises a portion 614 that informs the user of the reason that the requested media program is unavailable. Such reasons may include a local blackout, regional blackout, entitlement failure, or similar issue. In one embodiment, the location of the device receiving the media program can be determined by a global positioning system (GPS) receiver generating position information (e.g. latitude and longitude). Typically, such devices are included with smartphones and other mobile devices. The location of the device may also be determined by comparison of the internet protocol (IP) address of the device, to a location database. The banner window portion 602 also comprise a set reminder control 610 and an auto-return control 612. The set reminder control 610 allows the user to specify that they would like to be reminded when the media program is no longer blacked out, and is available to watch. This reminder may be set within the application executing on the device of the receiver station, or using the operating system of the device. The auto return control 612 automatically (e.g. without user intervention) transitions the device to the requested media program when the streaming of that media program is no longer precluded.

The program guide also includes an alternative content pane 604. In the illustrated embodiment, the alternative content pane 604 includes a number of panes, each having a depiction of the alternative content associated with the pane. These depictions include previews of movies or series episodes in a preview pane 620, previous episodes in a previous episode pane 622, games in a game pane 624, social media in a social media pane 626, suggested content in a suggested content pane 628, on-demand content in an on-demand pane 630, available content in a content pane 632, and other media in another media content pane 634. User selection of one of the panes 620-634 in the program guide 600 commands the system to request that alternative content, as further described below. Also included in the alternative content pane 604 is a control 636. Selection of the control 636 alters the contents of the alternative content pane 604 to include only alternative content that can be consumed within the estimated time before streaming of the requested media program can commence. For alternative content that is of fixed duration, this can be determined to from a comparison between the elapsed time presented in the banner 602 and the running time of the alternative content, if any.

The program guide 600 may also include an advertisement pane 606. The advertisement may be one of a plurality of advertisements stored in the device at the receiver station 110, or may be streamed from the streaming server. While the advertisement may be streamed to the device at the receiver station 110, it is not "live streamed," but instead simply retrieved and provided to the device at the receiver station. In this embodiment, the alternative content presented in the program guide may comprise streamed video or media programs, but not programs subject to a blackout restriction Turning now to FIG. 2B, after presenting the alternative content in the program guide, the user selects alternative content, as shown in block 228. Block 230 determines which type of alternative content was selected. If the alternative content is another media program stream, processing is passed back to block 202, and the process repeats. Since the requested media program was selected from the program guide as a media program that is not blacked out, the processing will typically be routed through blocks 202, 204, 206, 210-214, and the requested media program is streamed and presented to the user. If the receiver station 110 moves to a blackout region, (as determined by newly transmitted location, as shown in block 207), streaming may be terminated, and another program guide presented to the user.

If the user selects other media, processing is routed to block 232 which transmits an alternative content request having the alternative content ID 414 to the media program provider 102 via the web server 106B. The media program provider 102 receives the request, generates the alternative content identified by the alternative content ID 414, and transmits the alternative content via the web server 106 and if necessary, the media server 106A, as shown in blocks 234, 236, 238 and 240. The receiver station 110 receives the alternative content as shown in block 242 and presents the alternative content as shown in block 244. When the presentation of the alternative content is completed, processing then returns to block 220, and updated second information is generated, transmitted to the device, and used to present an update program guide. In this case, instead of being generated in response to a media program request, the second information is generated in response to the user request for an updated program guide or when the consumption of the alternative content has been completed (e.g. the end of a streamed media program has been streamed or a video game has been completed). The program guide may also include a regional affiliate indicator 638 to provide information regarding the identity of the regional affiliate. A hot link to the URL of the regional affiliate may also be provided.

In one embodiment, the entitlement map 132 is updated on a continuous basis, and therefore, available to determine the current transition state of a media program quickly when required without substantial processing.

Hardware Environment

Figure 7:
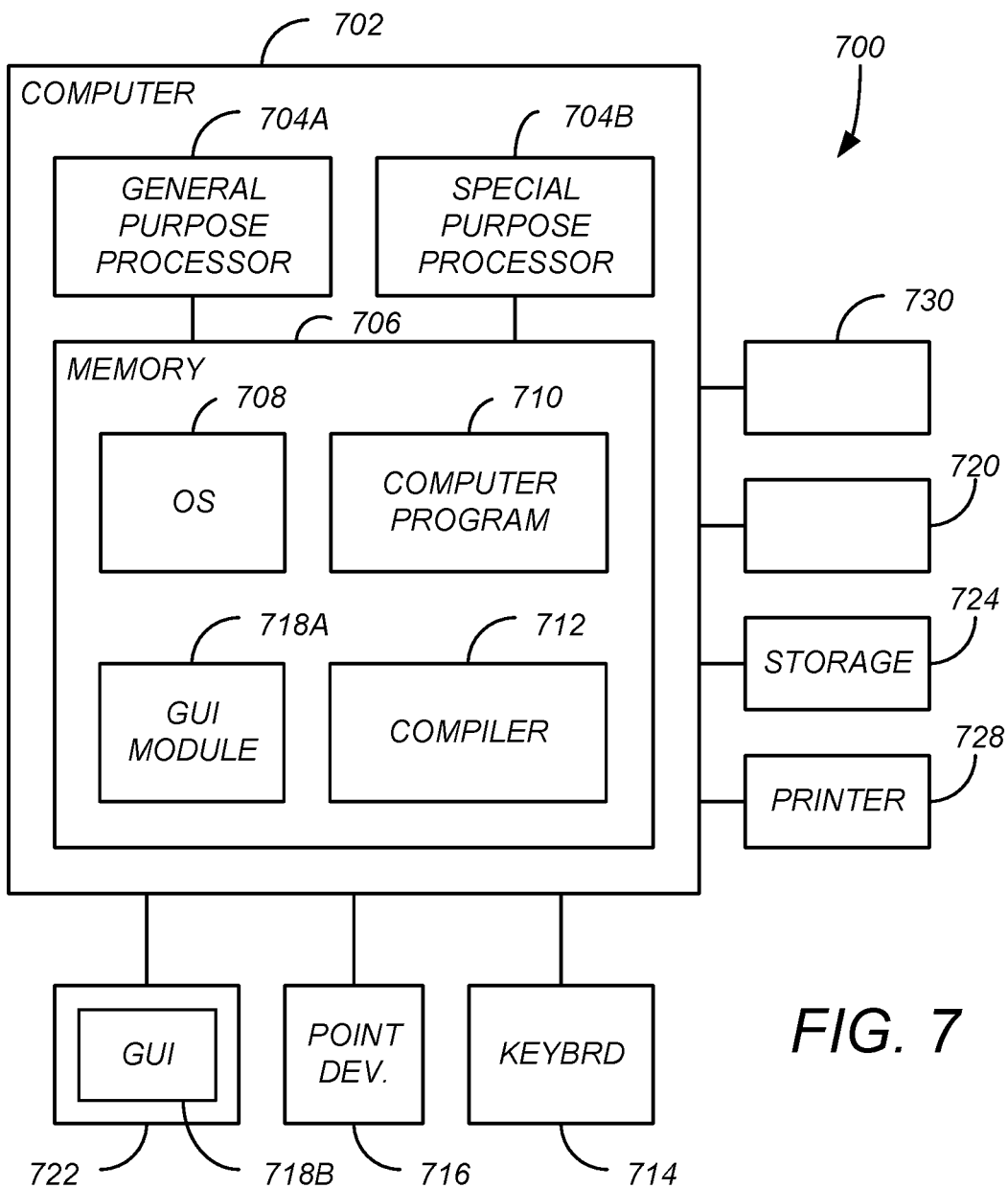
FIG. 7 illustrates an exemplary computer system that could be used to implement processing elements of the geolocation system.

FIG. 7 illustrates an exemplary computer system 700 that could be used to implement processing elements of the above disclosure, including the devices at the receiver station 110, the servers 106, the content manager, transmission state analyzer 130, entitlement map 132, stream controller 134, alternative content generator 136 and alternative content database 140. The computer 702 comprises a general purpose processor 704A and/or a special purpose processor 704B and a memory, such as random access memory (RAM) 706. The computer 702 is operatively coupled to a display 722, which presents images such as windows to the user on a graphical user interface 718B. The computer 702 may be coupled to other devices, such as a keyboard 714, a mouse device 716, a printer 728, etc. Of course, those skilled in the art will recognize that any combination of the above components, or any number of different components, peripherals, and other devices, may be used with the computer 702.

Generally, the computer 702 operates under control of an operating system 708 stored in the memory 706, and interfaces with the user to accept inputs and commands and to present results through a graphical user interface (GUI) module 718A. Although the GUI module 718B is depicted as a separate module, the instructions performing the GUI functions can be resident or distributed in the operating system 708, the computer program 710, or implemented with special purpose memory and processors. The computer 702 also implements a compiler 712 which allows an application program 710 written in a programming language such as COBOL, C++, FORTRAN, or other language to be translated into processor 704 readable code. After completion, the application 710 accesses and manipulates data stored in the memory 706 of the computer 702 using the relationships and logic that was generated using the compiler 712. The computer 702 also optionally comprises an external communication device such as a modem, satellite link, Ethernet card, or other device for communicating with other computers.

In one embodiment, instructions implementing the operating system 708, the computer program 710, and the compiler 712 are tangibly embodied in a computer-readable medium, e.g., data storage device 720, which could include one or more fixed or removable data storage devices, such as a zip drive, floppy disc drive 724, hard drive, CD-ROM drive, tape drive, etc. Further, the operating system 708 and the computer program 710 are comprised of instructions which, when read and executed by the computer 702, causes the computer 702 to perform the operations herein described. Computer program 710 and/or operating instructions may also be tangibly embodied in memory 706 and/or data communications devices 730, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of managing streaming of a regionally premier media program to a device disposed at a location, comprising:
  (a) receiving a request to stream the media program to the device, the request comprising:
    an identifier of the media program;
  (b) in response to the received request, determining a current transmission state of the media program to the device at a location according to the identifier of the media program and the location of the device, the current transmission state comprising:
    a first current transmission state wherein streaming the media program to the device is not precluded;
    a second current transmission state wherein streaming of the media program to the device is precluded; and (c) in response to a determination that the current transmission state is the second current transmission state:
terminating any streaming of the media program to the device and transmitting second information in lieu of the streaming of the media program, the second information initiating presentation of alternative content by the device.

2. The method of claim 1, further comprising:
determining the location of the device.

3. The method of claim 2, wherein:
the request is transmitted via a transceiver having a network identifier; and
determining the location of the device comprises:
determining the location of the device from the network identifier.

4. The method of claim 2, wherein:
the request is transmitted via an internet protocol (IP) from an IP address; and
determining the location of the device comprises:
determining the location of the device from the IP address.

5. The method of claim 2, further comprising:
transmitting, to the device, a request to determine the location of the device;
receiving a device-determined location of the device;
comparing the determined location of the device to the device-determined location of the device; and
validating the device according to the comparison.

6. The method of claim 5, wherein:
the device-determined location of the device is determined from at least one of:
Wi-Fi locating;
one or more Bluetooth beacons; and
a global positioning system signal.

7. The method of claim 2, wherein:
determining the location of the device comprises determining the location of the device by at least one of:
Wi-Fi locating;
Bluetooth beacons;
GPS; and
the method further comprises receiving the determined location of the device.

8. The method of claim 1, further comprising:
determining the second information according to:
the identifier of the media program;
a user identifier; and
the location of the device.

9. The method of claim 8, wherein the second information comprises program guide information for presentation on the device, the program guide information for initiating presentation of the alternative content.

10. The method of claim 9, wherein the program guide information includes a depiction of one or more other media programs for which the current transmission state is the first current transmission state and the method further comprises:
receiving a further request to stream a depiction-selected one of the one or more other media programs; and
repeating steps (b) and (c) with respect to the depiction-selected one of the one or more other media programs.

11. The method of claim 10, wherein the alternative content comprises a program guide, the program guide comprising a depiction of one or more social media portals associated with the media program, and the method further comprises:
receiving a request to access a depiction-selected one of the one or more social media portals associated with the media program; and
providing the social media portal to the device.

12. The method of claim 1, wherein determining the current transmission state of the media program to the device comprises:
comparing the identifier of the media program and the location of the device to an entitlement map, the entitlement map relating the current transmission state to entitlement map parameters comprising:
identifiers for a plurality of media programs including the requested media program;
identifiers for a plurality of users including the identifier of the user;
rules for streaming the media programs including the requested media program, comprising:
blackout rules, the blackout rules defining conditions precluding the streaming of the plurality of media programs including the requested media program to one or more geographical regions;
program guide data, including a schedule for streaming of the plurality of media programs including the requested media program to a plurality of regions including a region comprising the location of the device; and
determining the current transmission state according to the entitlement map.

13. A system for managing streaming of a regionally premier media program to a device, comprising:
web server for receiving a request to stream the media program to the device, the request comprising:
an identifier of the media program;
a transmission state analyzer, for determining, in response to the received request, a current transmission state of the media program to the device at a location according to the identifier of the media program and the location of the device, the current transmission state comprising:
a first current transmission state wherein streaming the media program to the device is not precluded;
a second current transmission state wherein streaming of the media program to the device is precluded; and
a stream controller that, in response to a determination that the current transmission state is the second current transmission state, terminates any streaming of the media program to the device;
wherein the web server transmits second information in lieu of the streaming of the media program, the second information initiating presentation of alternative content by the device.

14. The system of claim 13, wherein:
the request is transmitted via a transceiver having a network identifier; and
the location of the device is determined from the network identifier.

15. The system of claim 13, wherein:
the request is transmitted via an internet protocol (IP) from an IP address; and
the location of the device is determined from the IP address.

16. The system of claim 13, wherein:
the web server further:
transmits, to the device, a request to determine the location of the device;
receives a device-determined location of the device;
the transmission state analyzer further:
compares the determined location of the device to the device-determined location of the device; and
validates the device according to the comparison.

17. The system of claim 16, wherein:
the device-determined location of the device is determined from at least one of:
- Wi-Fi locating;
- one or more Bluetooth beacons; and
- a global positioning system signal.

18. The system of claim 13, wherein:
the location of the device is determined by at least one of:
- Wi-Fi locating;
- Bluetooth beacons;
- GPS; and the web server further receives the determined location of the device.

19. The system of claim 13, wherein the second information is determined according to:
- the identifier of the media program;
- a user identifier; and
- the location of the device.

20. An apparatus of managing streaming of a regionally premier media program to a device disposed at a location, comprising:

means for receiving a request to stream the media program to the device, the request comprising:
- an identifier of the media program;

means for determining, in response to the received request, a current transmission state of the media program to the device at the location according to the identifier of the media program and the location of the device, the current transmission state comprising:
- a first current transmission state wherein streaming the media program to the device is not precluded;
- a second current transmission state wherein streaming of the media program to the device is precluded; and means for terminating any streaming of the media program to the device and transmitting second information in lieu of the streaming of the media program, the second information initiating presentation of alternative content by the device in response to a determination that the current transmission state is the second current transmission state.

\* \* \* \* \*